United States Patent

[11] 3,532,069

| [72] | Inventors | Jesse P. Morgan<br>William T. Moon, Jr., Knoxville, Tennessee |
|---|---|---|
| [21] | Appl. No. | 740,717 |
| [22] | Filed | June 27, 1968 |
| [45] | Patented | Oct. 6, 1970 |
| [73] | Assignee | Robertshaw Controls Company<br>Richmond, Virginia<br>a corporation of Delaware |

[54] FLUIDIC INDICATOR AND SYSTEM THEREFOR
26 Claims, 15 Drawing Figs.

[52] U.S. Cl. .................................................. 116/70,
116/117, 92/48
[51] Int. Cl. ..................................................... G01l 13/00
[50] Field of Search........................................... 73/4;
137/81.5; 235/201, 200; 91/3; 92/129, 48, 64, 68;
116/117, 70; 235/200; 73/406, 410, 419; 116/70,
116

[56] References Cited
UNITED STATES PATENTS
3,131,603  5/1964  Hadekel ....................... 92/129

3,326,463  6/1967  Reader ........................ 235/201

*Primary Examiner*—Richard C. Queisser
*Assistant Examiner*—M. Smollar
*Attorneys*—Auzville Jackson, Jr., Robert L. Marben and Candor, Candor and Tassone ABSTRACT: This application discloses a fluidic or pneumatic indicator and a system for using the same. The indicator has a casing within which is an arch-shaped indicating signal underneath a window at the top of the indicator. Two fluid responsive diaphragm motors at the lower part of the casing rock the arch-shaped indicator so that such indicator displays different colors, or other signals, depending on the fluid impulses or signals received by the diaphragm motors. A locking lever locks the arch-shaped indicating signal in one position in response to the action of one diaphragm motor and releases such indicating signal in response to the action of the other diaphragm motor. The indicator is used in fluid pressure systems to indicate the sequences of fluid controls imposed on one or more operating mechanisms or the operating condition of a fuel operated engine.

Patented Oct. 6, 1970

3,532,069

INVENTORS
JESSE P. MORGAN
WILLIAM T. MOON, JR.
BY
Candor & Candor
THEIR ATTORNEYS

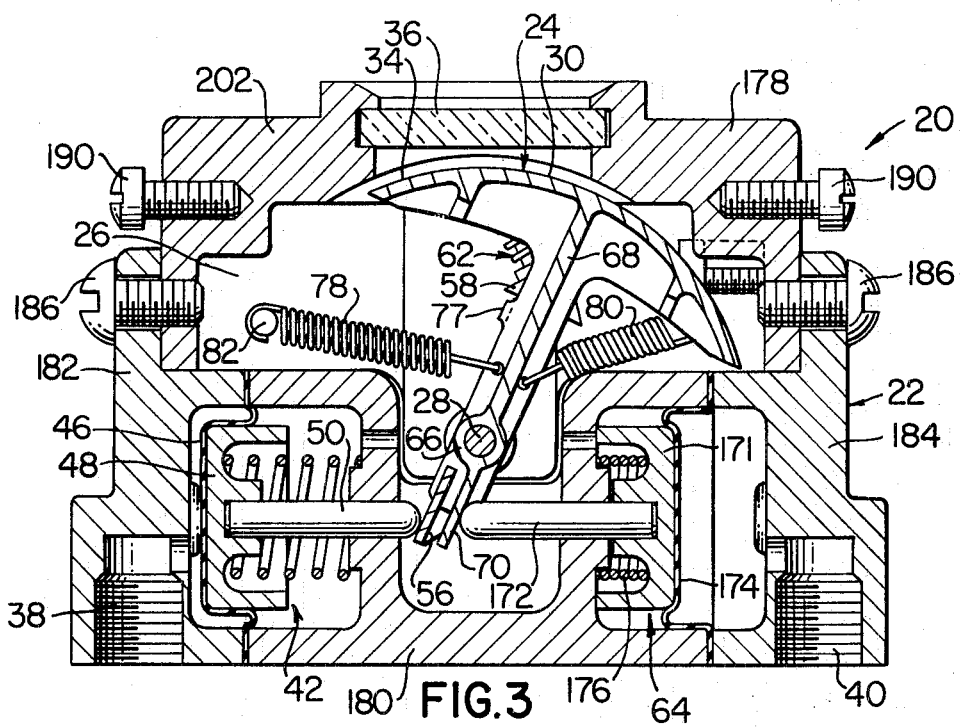
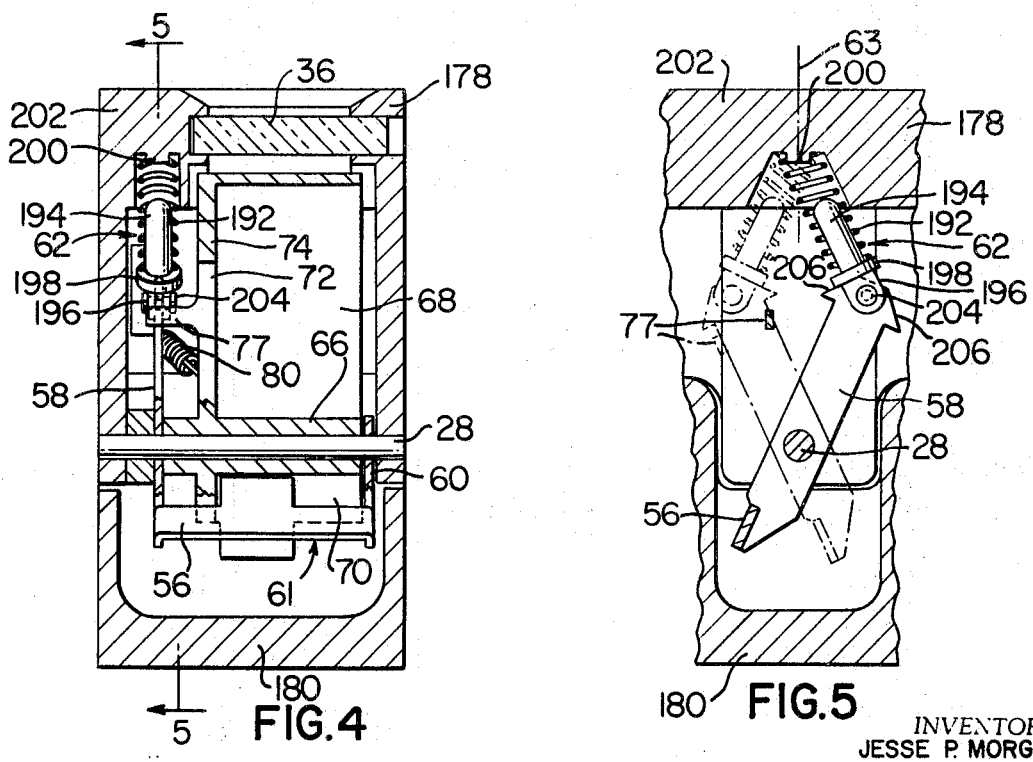

INVENTORS
JESSE P. MORGAN
WILLIAM T. MOON, JR.
BY
Candor & Candor

THEIR ATTORNEYS

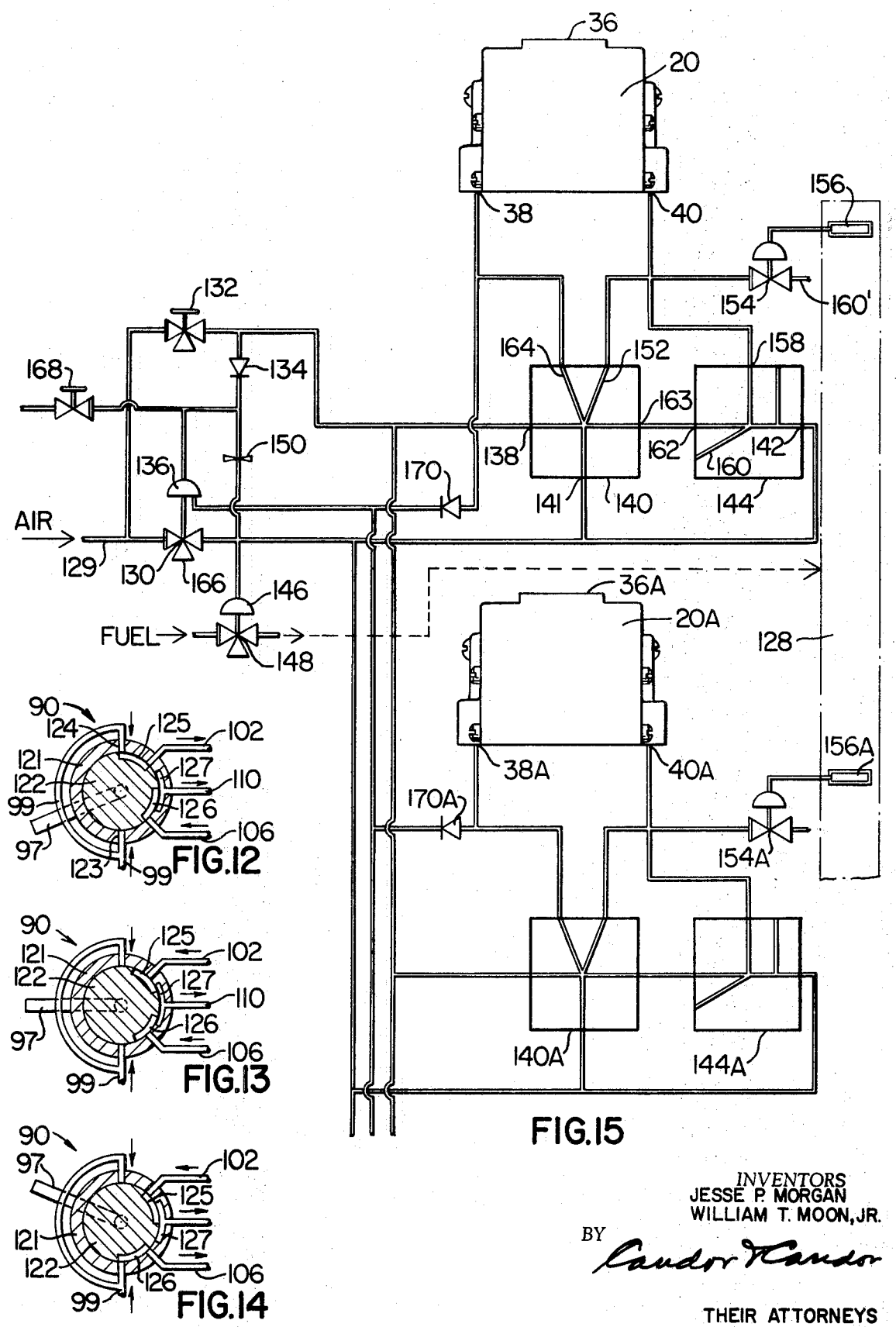

FLUIDIC INDICATOR AND SYSTEM THEREFOR

This invention relates to a fluid indicator and system therefor.

One of the features of this invention includes an indicator having a casing within which an indicating signal is moved back and forth behind a window on the casing. Two fluid responsive motor means move the indicating signal back and forth in response to fluid signals received from the fluid system with which the indicator is used. A locking means locks the indicating signal in one position when a first fluid signal is received by the first motor means and unlocks the indicating signal when a second fluid signal is received by the second motor means. The indicating signal moves to an intermediate position when neither the first or the second indicating signal is received by the first and second motor means.

Another feature of this invention includes the use of an arch-shaped indicating signal behind the window.

Another feature includes the fluid system that operates one or more mechanisms and one or more indicators indicate the sequences and/or condition of operation of such one or more mechanisms.

Another feature of this invention includes a system in which the operation, condition and control of a fuel operated engine is effected and in which one or more indicators indicate the operation, condition and control of such engine.

Other features of this invention are apparent from this description, the appended claimed subject matter, and/or the accompanying drawings, in which:

FIG. 3 is a view similar to FIGS. 1 and 2 and showing the indicator with its indicating signal means in its right or clockwise actuated and unlocked condition after the second or right motor means has received and continues to receive a second signal.

FIG. 4 is a vertical cross section taken generally along the line 4–4 of FIG. 1.

FIG. 5 is a diagrammatic vertical cross section along the line 5–5 of FIG. 4.

Figure 11:
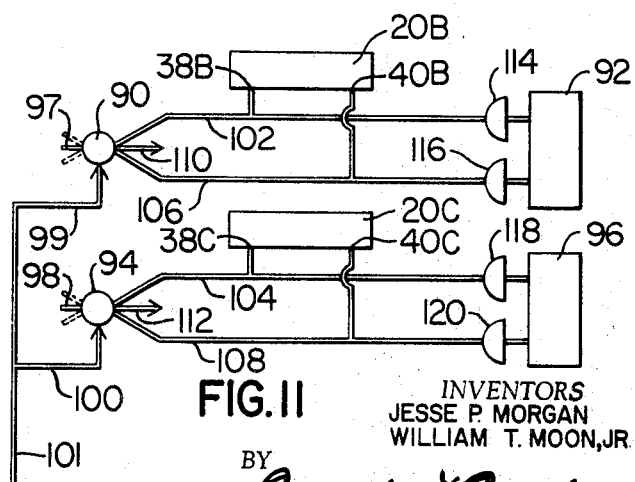
FIG. 11 is a diagrammatic view of a fluid system having two indicators respectively connected to two controlled mechanisms.

FIGS. 12, 13, and 14 are enlarged diagrammatic cross sections of a typical valve construction which may be used for the two valve constructions shown in FIG. 11, with FIG. 12 showing the actuator in lower position, with FIG. 13 showing the actuator in central position and with FIG. 14 showing the actuator in the upper position.

FIG. 15 is a diagrammatic view of a fluid system including two or more indicators connected with an engine to indicate the operating condition of the engine.

Certain words may be used in this application indicating direction, relative position, and the like. Such words are used for the sake of brevity and clearness, and in connection with the views of the drawings. In actual use, the parts described by such words may have entirely different direction, relative position and the like. Examples of such words are "vertical," "horizontal," "upper," "lower," and the like.

Figure 6:
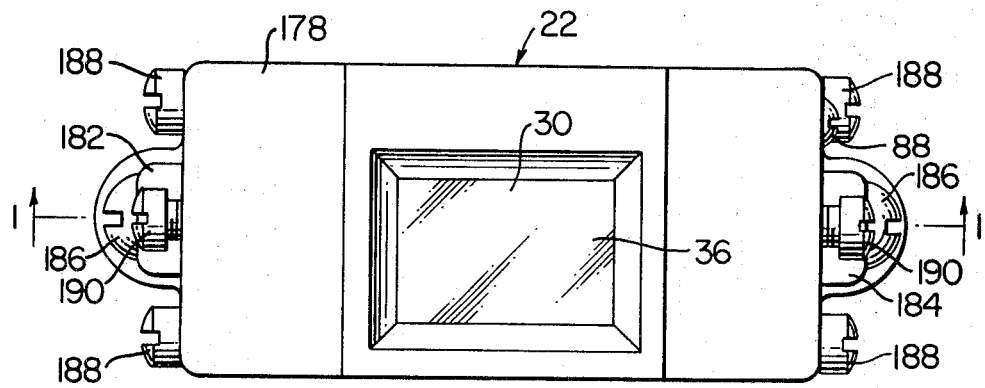
FIG. 6 is a diagrammatic top view of FIG. 1.

A locking and unlocking fluid actuated indicator 20, according to this invention, may include an outer indicator casing 22 which is provided with an indicating signal means or flag 24, which may be arch-shaped, and which is located in a signal means receiving space or cavity 26. The flag 24 may be moved back and forth or rocked or pivoted about a fulcrum pin 28. The flag 24 may have various signals or colors on its upper arcuate surface, such as white at 30 in the center or intermediate part, and red at arch end 32 and green at arch end 34. If the flag 24 is in its central position, as in FIG. 1, it displays an all white 30 signal through the lens or window 36, as in FIG. 6 and as shown in the windows 36, 36A, 36B, and 36C in FIG. 9 of a plurality of such indicators 20, 20A, 20B, and 20C. If the flag 24 is rocked to its full leftward position it will show or indicate part red 32 and part white 30, as in FIG. 8. If the flag 24 is rocked to its full rightward or clockwise position it will show or indicate part white 30 and part green 34, as in FIGS. 3 and 10.

Figures 8, 9, 10:
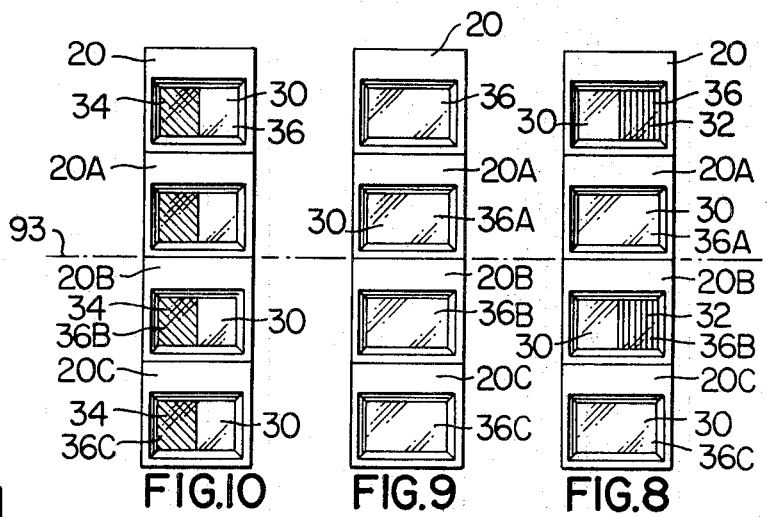
FIG. 8 is a diagrammatic top view of a battery of indicators side by side and similar to the indicator of FIG. 1, with the signal means of the first and third indicators from the top of FIG. 8 in the locked condition of FIG. 2.
FIG. 9 is a view similar to FIG. 8 with all the signal means of the battery in the position of FIG. 1.
FIG. 10 is a view similar to FIGS. 8 and 9, with all of the signal means of the battery in the condition of FIG. 3.

A plurality of such indicators 20, 20A, 20B, and 20C may be assembled together in a battery, as shown in FIGS. 8, 9, and 10. Such indicators may be connected to pneumatic or fluid systems, such as shown in FIGS. 11 and 15, or to either of such systems without the other.

Figure 1:
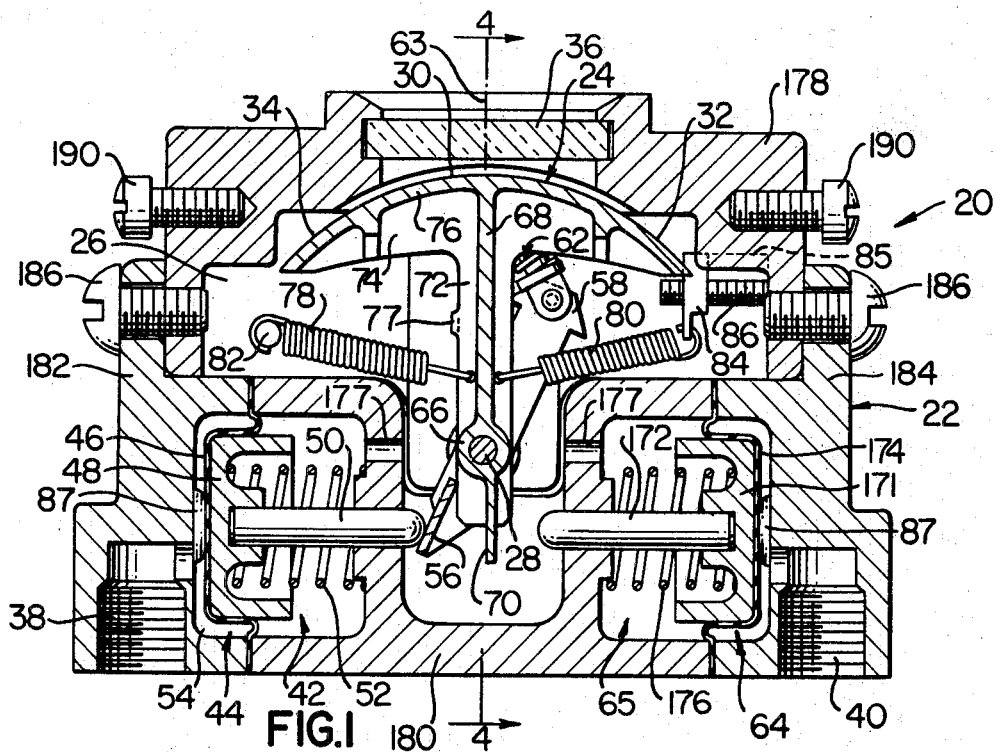
FIG. 1 is a diagrammatic vertical cross section, taken along the line 1–1 of FIG. 6, and showing a fluid actuated indicator according to this invention, with its indicating signal means in unactuated and reset or central condition.
Figure 2:
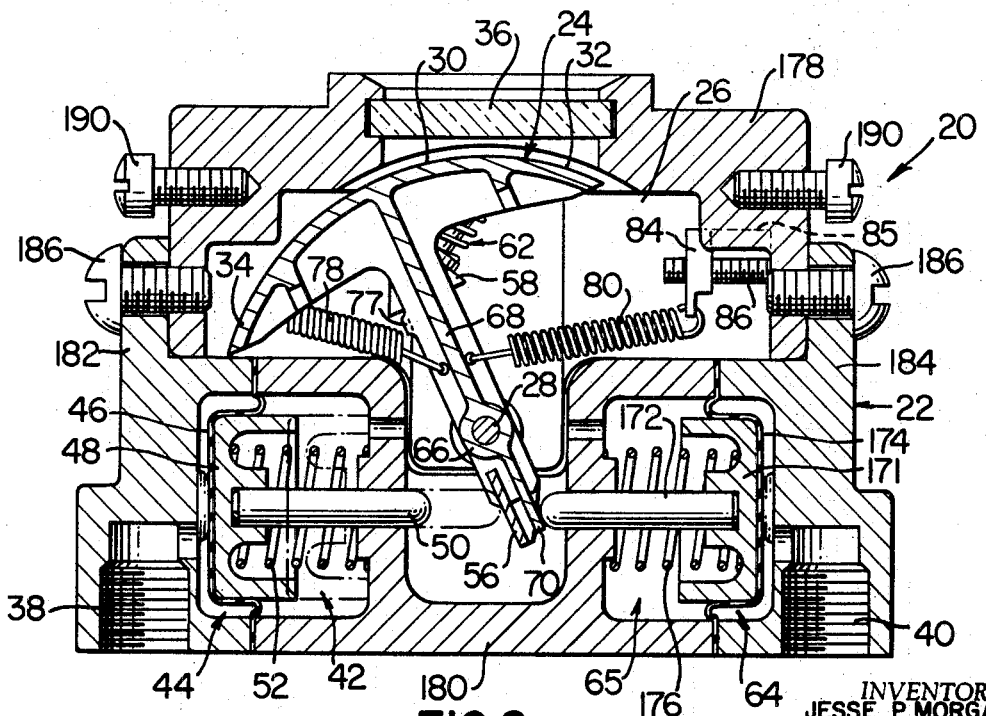
FIG. 2 is a view similar to FIG. 1 and showing the indicator with its indicating signal means in its left or counterclockwise locked condition after the first or left motor means has received a first signal and such signal has been terminated or vented.

The locking and unlocking indicator 20 (and 20A, 20B, and 20C) may be of such construction that the signal means or flag 24 rocks to its most leftward or first position, FIG. 2, when a first fluid signal or pressure is introduced at casing opening 38. The flag 24 is automatically locked in such leftward position, as in FIGS. 2 and 8. The flag 24 remains in such position even after such first fluid signal is discontinued and until a second fluid signal or pressure is introduced at casing opening 40. Signal pressure at 40 unlocks the flag 24 and causes the flag 24 to be moved to its full rightward position, as in FIG. 3, thereby exposing a combined green signal 34 and white signal 30 at window or lens 36, as shown in FIG. 10. Later if such signal pressure at 40 is discontinued and signal pressure at 38 remains discontinued, the flag 24 moves to its central position as shown in FIG. 1, by spring action to be described. This causes an all white signal 30 to be displayed at window 36, as shown in FIGS. 1 and 9.

A plurality of such indicators 20, 20A, 20B, and 20C (side by side, if desired), may be combined and mounted as a battery to display their windows as shown in FIGS. 8, 9, and 10, where the same windows are shown in each vertical row, with different signals being displayed behind the respective lenses 36, 36A, etc. For convenience in description the parts of the first described indicator 20 may be identified by reference numerals without suffixes. Where substantially identical or similar parts are used in the later described indicators 20A, 20B, and 20C, or later described parts of the system or systems, such identical or similar parts may be identified by reference numerals with suffixes A, B, and/or C, etc., as the case may be.

DETAILS OF INDICATOR 20

The indicator casing 22 may include a fluid responsive first motor means 42 which may be located in a first motor means space or cavity 44. Such first motor means 42 may have a first diaphragm 46, a first diaphragm shoe or plunger 48, a first rod or stem 50, and a first return compression spring 52.

When a first pressure fluid signal is introduced in opening 38, such fluid enters the first pressure chamber 54 of the first motor means 42 behind the diaphragm 46 and plunger 48 to cause the rod 50 to push rightwardly against the lower end or bridge 56 of a snap lever or leg 58, FIGS. 4 and 5, which is fulcrumed on fulcrum pin 28 and which is connected to another lever or leg 60, FIG. 4. That is, the bridge 56, and lever legs 58 and 60 form a composite U-shaped snap lever 61, FIG. 4, which is snapped back and forth by snap spring construction 62 past the vertical center 63, FIG. 5, by the counterclockwise action of the first motor means 42 and by the clockwise action of second motor means 64 in cavity 65, both later to be described.

The snapping back and forth, counterclockwise and clockwise, of the snap lever 58 respectively by the alternate pressurization of the first motor means 42 and second motor means 64 causes the arch-shaped flag 24 to be moved to the leftmost position of FIG. 2 when the first motor means 42 is pressurized. The flag 24 remains in such left-most position until the second motor means 64 is pressurized, as in FIG. 3, at which time the flag 24 is moved to its right most position of FIG. 3. The flag 24 can be moved by spring action to be described to the central position 63 of FIG. 1 by the venting or depressurization of the second motor means 64, through the opening 40, as shown in FIG. 1.

The flag 24 is fulcrumed on pin 28 by a sleeve 66 which is integral with an upward flat wall 68 and a lower or downward flat wall 70. A side flange wall 72 is also integral with the sleeve 66 and merges with an arch supporting flange 74, FIG. 1, which supports the arch 76. The upper or outer surface of arch 76 forms the indicating means or flag 24 which carries the signals or colors white 30, red 32, and green 34.

When the snap lever 58 is snapped counterclockwise by the first motor means 42 in the dotted line position of FIG. 2, the lever 58 strikes an arm 77, FIGS. 2, 4, and 5, which extends from the indicator flange wall 72 and pushes the wall 72 and flag 24 to its leftmost position of FIG. 2. The snap lever 58 and the flag 24 will be locked in such leftmost position by the snap toggle action of the snap spring construction 62, even if the first motor means 42 is later vented or depressurized and the motor rod 50 and plunger 48 are returned to their full line leftmost positions by the return compression spring 52.

Figure 7:
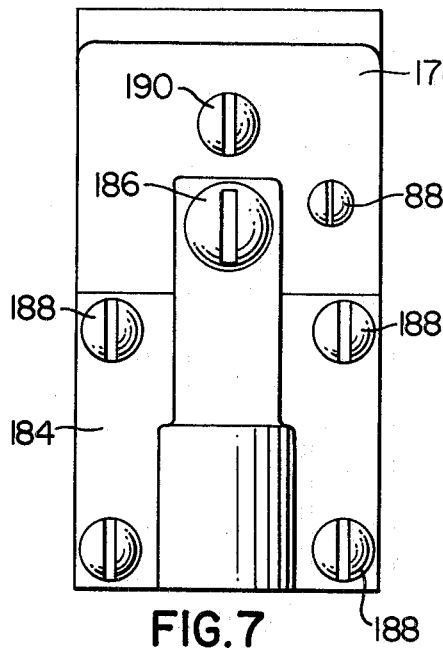
FIG. 7 is an elevation from the right side of FIG. 1.

Opposite flag centering tension springs 78 and 80 cause the indicator flag 24, or arch 76, to be centered at 63, FIG. 1, when the first and second motor means 44 and 64 are depressurized, as in FIG. 1, after the snap lever 58 had been returned to its clockwise position of FIG. 3 by the pressurizing of second motor means 64 in FIG. 3. The springs 78 and 80 have substantially equal spring tension loads, so that they can center the arch 76 under the window or lens 36, in FIG. 1, to display the all white signal 30 of FIGS. 6 and 9. The springs 78 and 80 have their central or inner ends secured to the side flange wall 72. The outer end of the spring 78 is secured to a rivet or screw 82 which is secured to the casing 22. The outer end of the spring 80 is secured to the lower end of adjustable tab or nut 84 which may have its upper end slidable in a groove 85, in the casing 22, FIG. 1. The tab 84 is adjustable by the screw 86, which has an adjusting head 88, as shown in FIG. 7.

When the motor plungers of the motors 42 and 64 are moved outwardly in FIGS. 1, 2, and 3, they are stopped in a slightly spaced position from the end walls of the casing 22 by bumpers 87, which are carried by such casing end walls to maintain a pressure chamber 54 for motor 42 and a similar pressure chamber of motor 64.

Further details of the indicator 20 are elsewhere further described.

THE FLUID SYSTEM OF FIGS. 11—14

FIGS. 11—14 show one type of fluid system which may be used with one or more indicators 20B and 20C. The indicator 20B may be connected with any suitable valve construction 90, such as shown in FIGS. 12—14, and with a mechanism 92 to be controlled and indicated. Indicator 20C may be connected to a similar suitable valve construction 94 and a similar (or different) mechanism 96 to be controlled and indicated. The valve construction 94 may be similar to valve construction 90, as is obvious. The valve constructions 90 and 94 may each be of the type which have a respective three position actuator 97 and 98. The valve constructions 90 and 94 may receive pressure air from branches 99 and 100 of pressure fluid or air supply pipe 101.

In the lower dotted line position of FIG. 11, for example, of the actuators 97 and 98, pressure air may be supplied to the lines 102 and 104 while the lines 106 and 108 are vented through the vent lines 110 and 112 to the atmosphere. When the actuators 97 and 98 are in their upper positions, the lines 106 and 108 are pressurized while the lines 102 and 104 are vented at 110 and 112 respectively. When the actuators 97 and 98 are in their central positions, for example, both the respective lines 102, 106 and 104 and 108 are depressurized or vented at 110 and 112.

Each of the mechanisms 92 and 96 may have pressure fluid or air motors or controllers 114, 116, 118, 120 which actuate various controlling actions in the mechanisms 92 and 96 when the air lines 102, 104, 106 and 108 are pressurized and/or vented by the control valve constructions 90 and 94.

The lines 102, 104, 106 and 108 are connected respectively with openings 38B, 38C, 40B and 40C of the indicators 20B and 20C, which will make indications at their respective windows in a manner similar to that shown in two or more of the windows 36B and 36C of FIGS. 8, 9 and 10.

In the operation of the system of FIG. 11, an attendant or mechanical controller may move the actuator 97 to its lower position, as in FIG. 12. This will pressurize line 102 and pressure motor 114 to cause mechanism 92 to operate in a certain manner. At that time line 106 is vented at line 110 so that pressure motor 116 does not affect mechanism 92. The indicator opening 38B is pressurized so that the indicator 20B assumes the positions of FIG. 2 with the first motor means 42 pressurized and signal flag 24 in its leftmost position. The window 36B of the indicator 20B will show a red signal 32 and white signal 30, as in FIG. 8, which will remain even if the valve actuator 97 is moved to its central position, FIG. 13, which will depressurize line 102 and motor 114 while line 106 and motor 116 remain depressurized, and the red and white signal remains. Thereafter, if the actuator 97 is moved to its upper position, FIG. 14, the line 106 and motor 116 and opening 40B are pressurized. This causes mechanism 92 to be controlled and operated by pressure motor 116 and causes the indicator 20B to have its parts moved to their positions of FIG. 3 with the signal flag 24 in its rightmost position and showing green 34 and white 30, as in FIG. 10. Thereafter, if the actuator 97 is moved to its central position, as in FIG. 13, the line 106 and pressure motor 116 will be depressurized, and the line 102 and motor 114 will remain depressurized, causing openings 38 and 40 to be vented and the parts of indicator 20B to assume the positions of FIG. 1 with the flag 24 showing all white 30 as in FIG. 9.

The valve construction 94, mechanism 96 and indicator 20C will respond to the movement of actuator 98 in the same manner as above described in connection with valve construction 90, mechanism 92 and indicator 20B.

For example, the mechanisms 92 and 96 may be of a character that each requires a first operation by upper motors 114 and 118 and a second operation by the lower motors 116 and 120. The indicators 20B and 20C may be banked together to show windows such as lower windows 36B and 36C of FIGS. 8, 9, and 10. The operator will be properly informed of the sequence of operations of the mechanisms 92 and 96 by the signals in windows 36B and 36C.

Referring now to FIGS 8, 9 and 10, assume that the indicators 20B and 20C below the dotted line 93 of FIGS. 8, 9 and 10 are banked together to show the two lower windows 36B and 36C of FIGS. 8, 9 and 10, and the windows 36 and 36A and 36C of FIGS. 8, 9 and 10 are to be disregarded. When the actuator 97 is moved to its lower position and actuator 98 remains in its central position, window 36B will show red 30 and white 32, and window 36C will show all white 30, as in FIG. 8. When the actuator 97 is moved to its central position and the actuator 98 remains in its central position, the windows 36B and 36C remain as in FIG. 8 and this would indicate to the attendant that the second operation by motor 116 of mechanism 92 has not been performed and should be performed. The attendant would therefore know that he should move actuator 97 up to perform the second operation by pressure motor 116 of mechanism 92. When the attendant moves the actuator 97 up to its highest position, the window 36B will show as in FIG. 10 to indicate that the second operation of motor 116 is being performed. When such operation is completed the attendant will move the actuator 97 to the central position and the window 36B shows all white 30 as in FIG. 9. As window 36C has remained all white the attendant would also know that the actuator 98 should first be moved down as in FIG. 12 to perform the first operation by motor 118 of mechanism 96 and thereafter move the actuator 98 up.

Hence the system of FIG. 11 can be used to control the mechanisms 92 and 96 with proper indications from indicators 20B and 20C. Such control can be by manual operation of the actuators 97 and 98 by an attendant who will be informed of the progress of the sequences of mechanisms 92 and 96 by the indications in windows 36B and 36C.

However, the system of FIG. 11 may also be used for automatic control of the mechanisms 92 and 96 by automatic actuation of the actuators 97 and 98 by an automatic timer, reciprocable piston and rod, or other automatic mover of the actuators 97 and 98.

The valve constructions 90 and 94 may be of any suitable construction such as shown in FIGS. 12, 13, and 14, which show specifically valve construction 90 but which obviously illustrate a construction that may be used for valve construction 94.

For example, the valve construction 90 may have an outer cylindrical casing 121 and an inner rotatable cylinder 122 which is rotatable in the casing 121 by the actuator or lever 97 which may be fixedly secured to one end of the cylinder 122. The branch line 99 of FIG. 11 may be further branched around the casing 122 so that it has opposite inlets 123 and 124 in casing 121. The cylinder has movable connecting channels 125 and 126, and the casing 121 has a stationary connecting channel 127 which is connected to vent pipe or opening 110. FIGS. 12, 13 and 14 illustrate the three positions of the actuator 97 and cylinder 122 which produce the actions previously described concerning lines 102, 106 and 110 in FIG. 11. Obviously a similar valve construction can be connected to lines 104, 108 and 112 of FIG. 11.

The operation of the valve construction 90 (and 94) is believed to be obvious from the illustration in FIGS. 11–14 and previous descriptions thereof.

The system of FIG. 11 may include one or two controlled mechanisms, indicators and valves, more than two controlled mechanisms, indicators, and valves, which may receive pressure fluid from line 101, as is obvious.

THE FLUID SYSTEM OF FIG. 15

The system diagrammatically shown in FIG. 15 may include two or more indicators 20 and 20A to show the operating condition and the unsafe cause of stoppage of a fuel operated engine 128 and the like. These indicators may be banked together as a battery to display their windows 36 and 36A side by side above the dotted line 93 of FIGS. 8, 9, and 10.

Air is supplied to the system of FIG. 15 from a source of supply of air under pressure 129 at approximately 5 psi to the normally closed ports of a fluidic three way diaphragm valve 130 as well as a manually operated push button three way start valve 132. If the push button valve 132 is actuated, air is admitted to flow through the valve 132 and through the check valve 134 to the diaphragm chamber 136 of diaphragm valve 130, and also to the left-hand signal port 138 of the "flip flop" gate 140. As pressure builds up in the diaphragm chamber 136 of valve 130, its normally closed port is opened and air is free to flow to the supply port 141 of the flip flop gate 140 and to the supply port 142 of the "or-nor" gate 144, as well as to the diaphragm chamber 146 of the fuel valve 148 which opens and permits starting of the engine 128. Air is also free to flow through the flip flop gate 140 and is deflected out the right-hand leg 152, due to the action of the pressurized left-hand signal port 138.

The push button valve 132 may then be released, thus stopping the flow of signal air to the left-hand signal port 138 of flip flop gate 140. With the previous opening of valve 130, air is also supplied from the valve 130 through the orifice or restriction 150 which continues to supply air from the now opened valve 130 to the diaphragm chamber 136 of valve 130 after the closing of valve 132 to maintain valve 130 open whereby opened valve 130 supplies air in a holding circuit manner to the diaphragm chambers 136 and 146 to respectively maintain valves 130 and 148 open.

Air will continue to flow out the right-hand leg 152 of the flip flop gate 140 with the loss of pressure at the left-hand signal port 138 since it is a bi-stable gate. Air is then free to flow to the engine condition responsive transmitter valve 154. If the valve 154 is responding to a safe or satisfied engine condition by its sensing member 156, the valve 154 is closed and pressure builds up in the line to the opening 40 of the indicator 20 as well as to the signal port 158 of the "or-nor" gate 144.

With air pressure supplied to the opening 40 of indicator 40, a white 30 and green 34 signal is displayed at window 36 of indicator 20 as shown in FIGS. 3 and 10. With air pressure supplied to the signal port 158 of the "or-nor" gate 144, the air passing through gate 144 from the supply port 142 is diverted to the "or" leg 160, and the system is properly pressurized so that indicator 20 can display the white and green signal at window 36 of FIGS. 3 and 10. When the operator sees this white and green signal he knows that he can release the start push button valve 132 and the engine 128 will continue to run with green and white signals since the system has been pressurized.

Should the transmitter 154 sense an unsafe engine condition at sensor 156 (such as an overheated engine water cooling system or the like), the transmitter valve opens and vents the signal air through vent opening or line 160' and thereby also vents indicator opening 40 as well as the line to the signal port 158 of the "or-nor" gate 144. With the loss of pressure to the signal port 158 of the "or-nor" gate 144 air is no longer deflected to the "or" leg 160, and being a mono-stable gate, air will now flow out the "nor" leg 162 area into the right-hand signal port 163 of the flip flop gate 140. This deflects the flow through the flip flop gate 140 out the left-hand leg 164 and pressurizes opening 38 of indicator 20 as well as the line to the underside of the diaphragm in chamber 136 of valve 130.

With the pressure at opening 38 of indicator 20, as described above, the indicator 20 will assume the condition of FIG. 2, with the motor 44 in the dotted line position, and with the indicator flag 24 displaying a red 32 and white 30 indication as shown in FIGS. 2 and 8. With the pressure to the underside of the diaphragm 136 of valve 130, such valve 130 closes and vents the system at 166. The red and white signal is locked, as in FIGS. 2, and 8, and is retained even with the venting of the air system. This will indicate to the attendant that the condition at transmitter valve 156 caused the engine shut down that will now be described.

With the system previously pressurized at one time as described above and with fuel valve 148 open, the engine operated satisfactorily, and the engine ordinarily will be stopped only by opening the manual stop valve 168 which would vent the pressure off the top of diaphragm 136 of valve 130 and would vent the entire system at 166.

When the engine is manually stopped by opening manual valve 168, with no unsafe condition in the engine, the indicator 20 will have no pressure either at 38 or 40 so that it will show white 30 at window 36 as shown in FIGS. 1 and 9, with the flag 24 centered by springs 78 and 80. However, if the engine is stopped or shut down by venting the system at valve 154, because of an unsafe engine condition, the indicator 20 will display red and white at window 36 as shown in FIGS. 2 and 8 as previously described. Then the operator will know that the unsafe engine condition at the transmitter valve 154 caused the shut down of the engine and will know that such unsafe condition will have to be corrected before starting the engine again.

The engine may be provided with one other indicator 20A, another transmitter valve 154A, another signal window 36A, another flip flop gate 140A, another "or-nor" gate 144A, another indicator opening 38A and another indicator opening 40A. Suitable pipe connections can be connected to valves 130, 132, etc., as shown in FIG. 15 to impart the same corresponding air flows, pressures, etc. that have been described in connection with indicator 20 and transmitter valve 154. The indicator 20A will display its signals underneath the window 36A in FIGS. 8, 9 and 10, so that the windows 36 and 36A will show all white 30 as in FIG. 9 when the engine has been stopped manually by opening valve 168 without any unsafe engine conditions. The windows 36 and 36A will have their signal flags displaying green 34 and white 30 as shown in FIG. 10, when the engine has been started satisfactorily and as long as the engine continues to run satisfactorily. However, when engine is shut down by an unsafe condition such as sensed by transmitter 154 but with no unsafe condition sensed by transmitter 154A, then the windows 36 and 36A will display one window 36 showing red and white and with the other window 36A showing all white 30, or vice versa.

The unsafe condition air pressure impulse at indicator opening 38 can pass the leftwardly openable check valve 170 on its way to the underside of diaphragm 136. However, this impulse cannot be transferred to indicator opening 38A because such impulse cannot pass rightwardly through the rightwardly closable check valve 170A. Conversely, an unsafe condition at transmitter sensor 156A can cause an impulse at opening 38A and, past leftwardly openable check valve 170A to the underside of diaphragm 136 to stop the engine and show a red and white signal at window 36A. The check valves 170 and 170A will not permit such impulse to impart a signal at opening 38 to cause a red and white signal at window 36.

More than two indicators and transmitters can be used in the engine system and more than two signal windows can be provided, as is obvious.

The windows in FIGS. 8, 9, and 10 above the dotted line 93 are for the engine system of FIG. 15 and the windows below the dotted line 93 are for the mechanism system of FIGS. 11—14. More windows can be used above and below the line 93. Also the windows for the system of FIG. 15 need not be adjacent the windows for the system of FIGS. 11—14 and vice versa.

The terms "or-nor" gate or valve and "flip flop" gate or valve, are well known in the pneumatic or fluidic industry, and constructions capable of performing the functions of the flip flop gates 140 and 140A and the functions of the "or-nor" gates 144 and 144A are well known, per se, and are available from manufacturers and suppliers of such equipment. Such manufacturers and/or suppliers can supply such gates or valves to perform the above functions from the descriptions heretofore given herein. It is therefore believed unnecessary further to describe their functions and/or their constructions.

FURTHER DETAILED DESCRIPTION OF THE INDICATORS 20, 20A, ETC.

The indicators 20, 20A, etc. may have a generally T-shaped cavity 26 including a relatively long horizontal upper indicator or flag 24 cross space, as shown in FIGS. 1—3, and a depending vertical lower indicator or flat wall 68 receiving space and with an indicating window and/or lens 36 above the upper indicator cross space.

A generally T-shaped indicating signal means has a generally horizontal upper cross flag piece 24 in the upper cross space, and a generally flat pivot piece or wall 68, 70 located in the vertical lower indicator wall space. The wall or pivot piece 68 and 70 is secured at the upper end to the central part of the upper cross piece or flag 24, and is pivoted on the horizontal fulcrum pin 28 intermediate the upper and lower ends of the vertical pivot piece to form a lower pivoted flat wall 70 below the pivot pin 28, and an upward pivoted flat wall 68 above the pivot pin 28.

The first and second motor means receiving cavities 44 and 65 are on opposite sides of the vertical lower indicator space.

A fluid responsive signal first motor means 42 is in the cavity 44 and has moving means or plunger 48, rod 50 and diaphragm 46 to move said lower pivoted flat wall 70 when said motor means 42 receives a first fluid signal through opening 38 to rock one end 32 of said upper cross flag piece 24 under the indicating window 36.

The second motor means 64 is in the cavity 65 and has moving means, such as plunger 171, rod 172, diaphragm 174 and return spring 176 to move the lower pivoted flat wall 70 when said second motor means 64 receives a second fluid signal through opening 40 to rock the other end 34 of the upper cross flag 24 under the indicating window 36.

Breather openings 177 connected to the atmosphere may be provided on the inner sides of the plungers 48 and 171 to maintain atmospheric pressure at all times on the inner sides of the plungers and diaphragms 46 and 174. The casing 22 has separate housings to be described with sufficiently loose joints to maintain atmospheric pressure at the inner ends of breather openings 177.

Balanced spring means 78 and 80 on opposite sides of the vertical flat pivot piece 68 move said pivot piece 68 to vertical central position, as in FIG. 1, when said first and second signals are simultaneously not received by said first and second motor means 42 and 64 under the conditions of FIG. 1 after the conditions of FIG. 3.

Locking lever means 58, 56 and 60 are pivoted on fulcrum pin 28 and are rocked by said first motor means 42 to the locking position of FIG. 2 when said first motor means 42 receives said first signal through opening 38 as shown in dotted lines in FIG. 2 to lock the lower pivoted flat wall 70 in the moved position of FIG. 2, and to hold one end 32 of said upper cross flag piece 24 under the indicating window 36 after such first signal is removed from said first motor means as shown in full lines in FIG. 2. The arm 77 moves said locking lever 58, 56 and 60 to unlocking position of FIG. 3 when said second motor means 64 receives a second signal through opening 40 to release said upper cross flag piece 24 and to rock the other end 34 of said flag piece 24 under said indicating window 36, as in FIG. 3.

The indicator casing 22 may include an upper flag casing housing 178, a lower motor means casing housing 180, and first and second diaphragm covering casing end housings 182 and 184 to cover, secure and seal said first and second diaphragms 46 and 174 in the casing 22. Said housings 182 and 184 have the first and second signal receiving openings 38 and 40 respectively. Such housings 182 and 184 may be secured to the upper flag casing housing by screws 186 and to the lower casing housing 180 by screws 188, FIG. 7. The support screws 190 may be used to support the indicator 20 to suitable support means, as desired.

The locking lever 58, 56, 60 may have a snap compression spring 192, FIGS. 4 and 5, held at its lower end by a combined pivot rod 194 and clevis 196, so that a circular spring seat or shoulder 198 receives the lower end of the spring 192. The upper end of the spring 192 is received by an upper spring seat 200 in the upper generally horizontal wall 202 of the upper flag casing housing 178. A loose rivet construction 204 passes through the clevis 196 and the snap lever 58 to provide the desired snap action for the snap lever 58. A pair of snap limit shoulders 206 limit the rocking movement of the snap lever 58 by engagement with shoulder 198, as shown in FIG. 5.

The check valves 170 and 170A may be provided with slow backward pressure leaks insufficient to allow the stop pressure impulse sent to opening 38 of indicator 20 to enter the opening 38A of indicator 20A, and vice versa. Such backward leaks are also insufficient to prevent proper stopping of the engine by venting at valve 130 by such pressure impulse to opening 38 or 38A, as the case may be. However, such backward leaks are sufficient to vent the underside of the diaphragm 136 after the engine has been stopped, inspected, etc., and before the system is again to be pressurized for starting of the engine.

Additionally or alternatively a slow leak or vent to the atmosphere from the underside of the diaphragm 136 may be provided for the same purpose.

It is thus to be seen that a new, unobvious and useful fluidic indicator means and system means therefor have been provided. While the embodiment now preferred has been disclosed as required by statute, other embodiments may be used, all coming within the scope of the claimed subject matter which follows.

We claim:
1. In combination:
an indicator casing;
an indicating signal means in said indicator casing;
a fluid responsive signal first motor means in said indicator casing having moving means adapted to move said indicating signal means to an indicating first position when said first motor means receives a first fluid signal;
a fluid responsive signal second motor means in said indicator casing having moving means adapted to move said indicating signal means to an indicating second position when said second motor means receives a second fluid signal;
locking means to lock said indicating signal means in said first position when said first fluid signal is received by said first motor means and to unlock said indicating signal means from said first position when said second fluid signal is received by said second motor means;
and means to return said indicator means to an indicating third position when having been displaced therefrom and when no signal is being received by either said first motor means or said second motor means and the indicator means is not in a locked condition.

2. A combination according to claim 1 in which signal sending means is provided selectively to send first and second fluid signals respectively to said first motor means or said second motor means.

3. A combination according to claim 2 in which the fluid in said fluid signals is air having a pressure different from ambient atmosphere.

4. A combination according to claim 2 in which means are provided selectively to vent each of said first and second motor means when said first and second fluid signals are selectively sent to said first and second motor means.

5. A combination according to claim 4 in which means are provided simultaneously to vent both said first and second motor means to cause indicator means to move to said third position.

6. A combination according to claim 1 in which signal sending means is provided including a source of pressure fluid, a selecting fluid flow control means causing said pressure fluid to be selectively sent to said first motor means and to a first place of fluid use, and to said second motor means and to a second place of use.

7. A combination according to claim 6 in which said pressure fluid is vented from said respective first and second motor means when fluid signals are being sent to the other of said respective first and second motor means.

8. A combination according to claim 7 in which means are provided simultaneously to vent both of said first and second motor means to cause said indicator means to return to said third position when having been displaced therefrom and the indicator means is not in a locked condition.

9. A combination according to claim 6 in which said first and second places of use are first and second fluid actuated valves.

10. A combination according to claim 9 in which said first and second fluid actuated valves differently control a mechanism.

11. A combination according to claim 10 in which said mechanism is a fuel operated engine.

12. A combination according to claim 11 in which one of said valves is a main signal fluid supply valve, and the other of said valves is an engine condition sensing valve which vents the signal fluid of said combination.

13. A combination according to claim 12 which includes a duplicate casing with duplicate first and second signal motor means and duplicate indicating signal means, and an additional engine condition sensing valve.

14. A combination according to claim 1 in which said indicating means is an arch.

15. A combination according to claim 14 in which said indicating first position displays one end of said arch, said indicating second position displays the other end of said arch and said indicating third position displays an intermediate part of said arch between said ends of said arch.

16. A combination according to claim 15 in which said first and second signal motor means respectively oppositely rock said arch to said indicating first and second positions.

17. A combination according to claim 16 in which spring means moves said arch to display said intermediate part of said arch.

18. In combination:
a casing having an indicator receiving generally T-shaped cavity including a relatively long horizontal upper indicator cross space and a depending vertical lower indicator space and with an indicating window above said upper indicator cross space;
a generally T-shaped indicating signal means with a generally horizontal upper cross flag piece in said upper cross space, a generally vertical flat pivot piece in said depending vertical lower indicator space secured at its upper end to the central part of said upper cross piece and being pivoted on a horizontal fulcrum pin intermediate said upper end and lower end of said pivot piece to form a lower pivoted flat wall below said fulcrum pin and an upward pivoted flat wall above said fulcrum pin;
first and second motor means receiving cavities on opposite sides of said vertical lower indicator space;
a fluid responsive signal first motor means in said first motor means receiving cavity and having moving means adapted to move said lower pivoted flat wall when said first motor means receives a first fluid signal to rock one end of said upper cross flag piece under said indicating window;
a fluid responsive signal second motor means in said second motor means receiving cavity and having moving means adapted to move said lower pivoted flat wall when said second motor means receives a second fluid signal to rock the other end of said upper cross flag piece under said indicating window;
balanced spring means on opposite sides of said vertical flat pivot piece to move said vertical pivot piece to vertical central position when having been displaced therefrom and when said first and second signals are not received by said first and second motor means and said indicating means is not in a locked condition;
locking lever means pivoted on said fulcrum pin and rocked by said first motor means to locking position when said first motor means receives said first signal to lock said lower pivoted flat wall in moved position to hold said one end of said upper cross flag piece under said indicating window after said first signal is removed from said first motor means, said lower pivoted flat wall moving said locking lever to unlocking position when said second motor means receives said second signal to release said upper cross flag piece and to rock the other end of said cross flag piece under said indicating window.

19. A combination according to claim 18 in which said cross flag piece is arch shaped.

20. A combination according to claim 18 in which first and second signal receiving openings are provided in said casing to guide said first and second fluid signals to said first and second motor means.

21. A combination according to claim 18 in which said first and second motor means have first and second motor means diaphragms and said casing includes an upper flag casing housing, a lower motor means casing housing and first and second diaphragm covering casing housings to cover and secure said first and second diaphragms in said casing.

22. A combination according to claim 21 in which said first and second diaphragm covering housings have first and second signal receiving openings.

23. A combination according to claim 18 in which said locking lever means is a generally U-shaped lever means with a relatively long lever, a relatively short lever and an intermediate bridge member joined to the lower ends of said long and short levers, said long and short levers being pivoted on said fulcrum pin.

24. A combination according to claim 23 in which said long lever has a snap means at its upper end.

25. A combination according to claim 24 in which said snap means includes a compression snap spring between the upper end of said long lever and an upper wall of said casing.

26. A combination according to claim 25 in which a pivot rod is loosely riveted to said long lever and receives the lower end of said snap spring.